March 17, 1970 P. GAIONE 3,500,510
QUICK-UNFASTENING DEVICE FOR SAFETY BELTS
Filed May 7, 1968 2 Sheets-Sheet 2

INVENTOR
Paolo Gaione

United States Patent Office 3,500,510
Patented Mar. 17, 1970

3,500,510
QUICK-UNFASTENING DEVICE FOR SAFETY BELTS
Paolo Gaione, Genoa, Italy, assignor to Quick-Free S.r.L., Genoa-Rivarolo, Italy, a company of Italy
Filed May 7, 1968, Ser. No. 727,233
Claims priority, application Italy, June 23, 1967, 7,106/67, Patent 807,190
Int. Cl. A44b 19/00
U.S. Cl. 24—230        7 Claims

ABSTRACT OF THE DISCLOSURE

The safety belt is provided with connecting means formed into two parts which are connected together by a cord. A sealed breakable phial containing a cord-weakening liquid is arranged near said cord, means being provided for breaking said phial whenever the vehicle is subjected to a violent deceleration, allowing the liquid in said phial to flow into contact with said cord, thus weakening same and permitting the automatic unfastening of the safety belt connecting means.

---

This invention relates to a connecting device for safety belts, particularly to be employed particularly in land motor vehicles and which, in case of a crash or other accident, after a short time automatically unfastens the safety belt and permits to the user, even if not completely conscious, to get out of the car.

It is known that safety belts in motor vehicles and particularly in land vehicles, save often the like of the user, by avoiding the projection of the user's body against the vehicle walls, windshield or roof. On the other hand, if a vehicle user secured by a safety belt to the vehicle seat, by a crash looses his consciousness and remains in a fainting fit in a dangerous position, the safety belt becomes a great hindrance to his rescuing; some time also rescuing people attempting to free an injured person tightly tied to the vehicle by means of a safety belt, often expose the same person to becoming more seriously injured.

It is therefore advisable that the safety belts becomes automatically unfastened after few seconds from the moment of the crash or other accident. According to the invention, this is effected by providing a safety belt-connecting device comprising a cord or like element which is sufficiently strong under normal conditions to resist to a normal pull to which it is subjected by a spring means but which, under the effect of an important deceleration, as it happens by a crash, is subject to being soaked by a liquid flowing out of a container fitted in its proximity of the cord and which has been broken during the crash. This liquid, by soaking the cord, greatly reduces its strength and permits, after few seconds, the automatic unfastening of the belt. According to a preferred embodiment of the invention, the liquid is contained in a phial or like container made of breakable material and fitted in a position to be stricken by a clapper head or like striking member which is strongly urged against the phial walls by the vehicle crash, so that the phial breaks and permits to the dissolving liquid with which it was filled to soak the said cord, which is thus weakened and is torn by said spring means.

In a preferred embodiment of the invention, the safety belt-fastening device comprises a substantially tubular body fastened by means of a hinge or the like to a fixed part of the vehicle frame and connected to one end of one of the two straps forming the safety belt by means of a connecting member comprising a tang provided with a transversal perforation and a conventional strap-end tying stirrup. Said tang is inserted in a transversal recess of said tubular body and the tang perforation comes to be in line with two like perforations made in said recess walls, so that through said three aligned perforations a retaining pin member may be inserted one of the ends of which, or head end, is passed through all three said perforations and is retained by a cord in proximity of a breakable phial containing the cord-weakening liquid, while the opposite pin end, or tail end, is connected to a pulling spring which has a sufficient force to break the said cord, when weakened and to slip same out of the tang perforation, thus setting said tang free to be pulled out of said body recess, and consequently setting one end of the safety belt free.

The invention will be better understood from the following specification of one preferred embodiment of the invention, which is described with reference to the accompanying drawings, in which.

Figure 1:
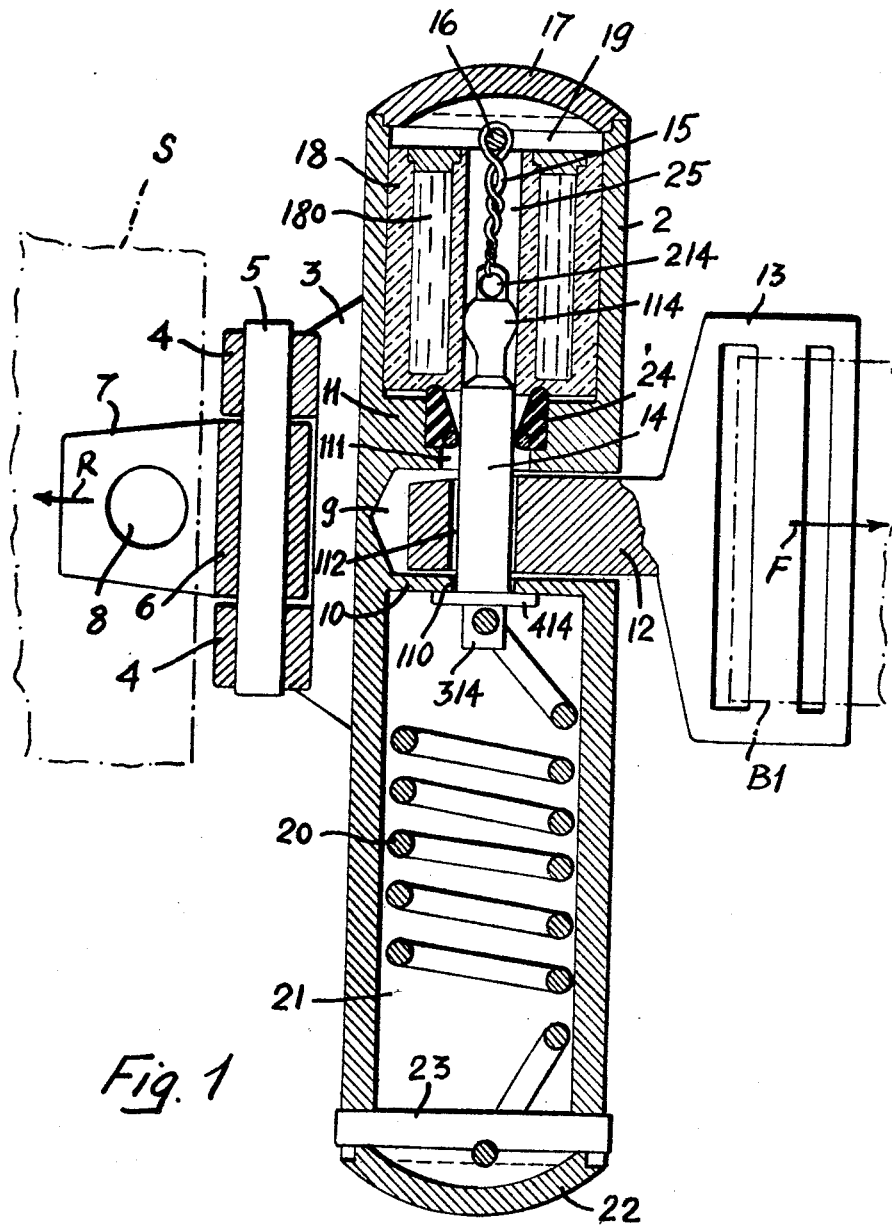
FIGURE 1 is a longitudinal section through a safety-belt connecting device.

The connecting device according to the invention in the embodiment as shown in FIGURE 1, comprises a hollow cylindrical body 1 subdivided by a pair of spaced partitions 10 and 11 into a front cylindrical housing 2, a rear cylindrical housing 21 and an intermediate transversal recess 9. The partition 10 has a through perforation 110, while the partition 11 has a wider perforation 111 aligned with perforation 110.

Said transversal recess 9 of the body 1 is closed at one end and, in correspondence of said closed end, at one of the body sides, a hinge leaf 3 is fastened, as by welding or otherwise. The hinge leaf 3 is provided with spaced bushings 4 between which a bushing 6 is hinged by means of a hinge pin 5. Said bushing 6 is integral of a wing 7 provided with a hole 8 for attaching said wing by means of a bolt or the like (not shown) to a fixed part (for example, a seat frame S, FIG. 2) of a vehicle.

In said transversal recess 9 an elongated tank 12 constituting an extension of a belt-end fastener or stirrup 13 is inserted. The tang 12 has a transversal through perforation 112 which may be brought in alignment with the perforations 110 and 111 of the body partitions 10 and 11 and through these three aligned perforations a hinge pin 14 may be inserted. Said pin 14 is provided at its rear or tail end with a washer-like abutment member 414 abutting against the partition 10 and with a perforated lug 314 extending rearwardly of said abutment 414, in the rear cylindrical housing 21. At the outer end of said housing a transversal rod 23 is mounted, held in place by a closure cap 22. Between this rod 23 and the perforated lug 314 a helical spring is anchored under tension, so as to tend to pull the pin 14 out of the aligned perforations 111, 112, 110, thus setting the tang 12 and the adjoining belt fastener 13 free.

In order to avoid this pin unthreading under normal circumstances, the pin 14, which has at its front end bell clapper-shaped head 114, is provided with a perforated lug 214 to which a retaining cord 15 may be fastened, which is anchored at its opposite end to a cross rod 16 retained in an end recess 19 of the front cylindrical housing 2 by a closure cap 17.

Within the bore 111 of the front partition 11 an elastic annular packing 24 is inserted, so as to prevent leakage of fluid past said packing, all around pin 14, while permitting at the same time a sidewise swinging of the head 114 when the pin is subjected to a violent lateral stress in correspondence of its section passing through the fastener tang 12.

Also within the housing 2 an annular phial 18 is inserted, whose bottom bears against the edge of the annular packing 24. Through the bore of the annular phial the rod head 114 is inserted. The annular phial 18 is made of a fragile material, such as a hard synthetic resin or glass, which may be broken when the striker head 114 is violently pressed or swung thereagainst. Said phial 18 is filled with a liquid 180 capable of dissolving or weakening the material of the cord 15 so as to be readily torn and permit of the pin 14–114 being unthreaded from the tang perforation 112 under the action of the pulling spring 20, thus setting the belt fastener 13 and the corresponding end of the belt strap B1 free.

Of course, to this end, for safety reason, a very strong thread or filament, such as a thread made of nylon filaments, is employed for making the cord 15. As cord-dissolving liquid a reagent is preferably employed, which does not have a corrosive action upon the passenger's clothes and skin.

Thus it has been found that, in practice, one of the nylon-dissolving or weakening liquids which may be employed for filling up the phial 18 is a liquid composed of an 85% solution of formic acid in water and methyl alcohol, which, in practice, weakens a nylon cord soaked therewith in a time of approximately 24 seconds and thus permits the automatic unfastening of the safety belt in less than half a minute.

Figure 2:
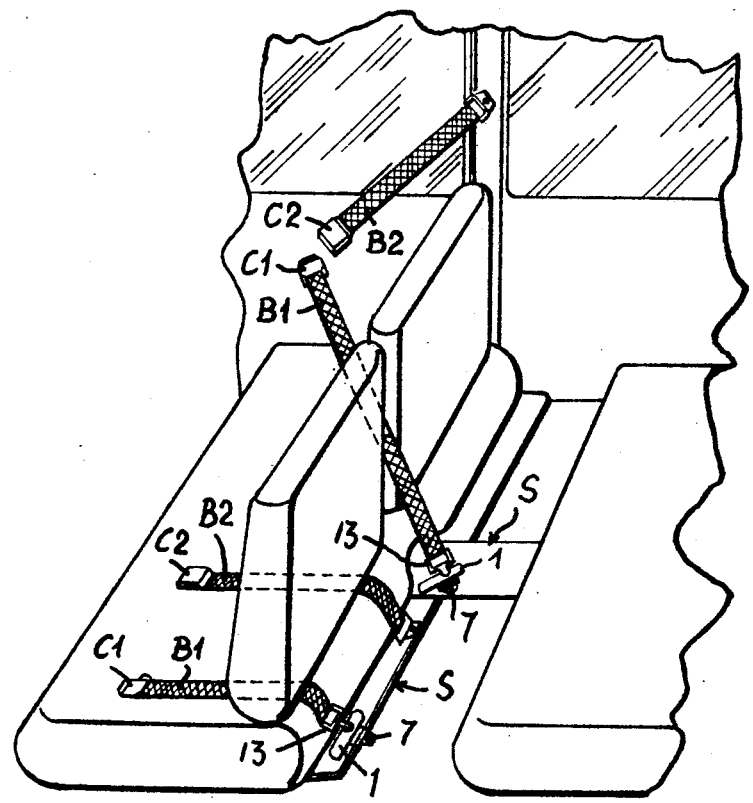
FIGURE 2 shows a preferred anchoring of said device at one end of a safety belt and to a part of the vehicle frame.

In practice, as shown in FIGURE 2, the safety belt comprises two straps B1–B2 fastened by one of their ends to a fixed part of the vehicle, or frame S, while the opposite end is provided with two complementary buckle parts C1–C2 which, when connected together, join the two strap means thus completing a "belly-safety belt" or a "shoulder safety belt," as shown at the left-hand and right-hand side of FIG. 1, respectively.

One of the straps B2 is fastened to the vehicle frame S by conventional means, while the other strap B1 is fastened to the same vehicle frame S through a fastener comprising the fastener or stirrup 13 and tang 12 retained by the tubular body 1 which in its turn is fastened by means of wing 7 to the vehicle or seat frame S.

When a passenger or driver wears the safety belt, in case of a crash or a violent deceleration, the wing 7 and the hollow body connected thereto are maintained firmly attached to the frame S, while the tang 12 of the fastener 13, being violently pulled in the direction of the arrow F, FIGURE 1, causes the pin 14 passed through its perforation 112 to be violently swung sidewise so that its head 114 strikes against the phial 18 which breaks and allows the liquid 180 to flow out and by soaking the cord 15, causes same to be dissolved or substantially weakened. When this happens, spring 20 pulls the pin out of the tang perforation 112 and thus the tang 12 with attached stirrup 13 and the end of the strap B1 connected thereto are free and the strap pairs B1–B2 forming the safety belt are no more retained at one of their ends and thus the body on which the safety belt was passed is no longer tied to its seat thereby and may readily get out of the car.

Usually, the resilient packing 24 has substantially merely the function of a tight seal, in order to prevent, at least for a certain time, that the liquid released from the broken phial could leak out of the hollow space 25, thus not performing its function of chemically dissolving the cord 15.

However, according to a variation in the embodiment of the invention, the packing 24 may also perform, up to a certain extent, the function of elastically supporting the pin 14. In this case, the breaking stress transmitted by the belt under strain is borne, at least in part, by the packing ring 24, which elastically yields, and therefore the head 114 of the pin comes to bear against the inner surface of the phial 18: when the impact stress is higher than a predetermined value, the yielding of the packing ring 24 drives the head 114 to hit against the inner wall of the phial 18 up to cause its rupture. This variation in the embodiment allows to employ for the phial 18 also a very fragile material, glass in particular, which, on the other hand, possesses to a high degree the characteristic of not being attacked by almost all the chemical substances. On the contrary, in the preceding case, since the stress is directly discharged onto the phial 18 by the head 114, the phial cannot be made of a too fragile material, so that the use of glass is not altogether advisable for the same, while other plastic materials like rigid polyvinyl chloride are far better adapted to this purpose. The plastic materials however present a range of unattackability to the chemical agents which is much more limited than the glass.

The afore-specified embodiment is presently deemed to be the best and preferable embodiment of the invention, however many variations and modifications may be brought to the same, above all in the construction, without for this departing from the leading principle of the invention as above specified.

I claim:

1. A connecting device inserted in a safety belt for securing persons to vehicles and permitting the quick unfastening of said belt after a violent pull due to a violent deceleration or crash, said device comprising a fastener adapted to be separably fastened to a body, a movable connecting means adapted to couple said fastener to said body, a spring under tension holding a cord element which is sufficiently strong under normal conditions to resist to the spring pull, said spring attached to and biasing said connecting means so as to uncouple the fastener and body, a sealed breakable phial containing a cord-weakening liquid, arranged near said cord, a movable striker head for striking against said phial, and breaking same, when the vehicle is subject to a violent deceleration, allowing the liquid contained therein to flow out into contact with said cord and said connecting means moving into uncoupling position by the spring bias when said cord is torn by the liquid and thereby permits the dissociation or disconnection of the device into two parts and the unfastening of said safety belt.

2. A device according to claim 1, comprising further an elongated hollow body divided by a pair of transversal partitions into a chamber at one end, containing the breakable phial, the striker head and the cord; means at the opposite end of said body for anchoring said spring under tension; said fastener being a safety belt strap fastener provided with a tang inserted between said pair of partitions and provided with a transversal perforation, said connecting means being a stem connecting said striker head to said spring through said tang perforation, a safety belt part connected to said fastener and a part of the vehicle frame connected to said body; and means for avoiding flowing of the liquid out of said chamber, when, after a crash or vehicle deceleration, the phial has been broken by said striker head being violently swung by the pull exerted through said tang.

3. A device for detachably connecting safety belts to vehicle seat frames, according to claim 2, comprising a cylindrical hollow body, a pair of axially bored spaced end partitions dividing said cylindrical body into a front and a rear cylindrical chamber; a transversal recess between said partitions; said connecting means being a pin provided with a spring-anchoring tail end and with said striker head extending from said front chamber into the rear chamber, by passing through said aligned partition perforations and tank perforation; said pulling spring being in said rear end chamber, anchored near the chamber bottom and attached to the tail end of said pin; said cord anchored to the end of said front chamber and attached to said striker head; and said phial being a breakable sealed container, filled with a cord-corrosive liquid arranged in said front chamber in the path of said striker head and in proximity of said pin-retaining cord.

4. A device according to claim 3, wherein the container containing the cord-corrosive liquid is in form of an annular phial encircling the striker head of the said tang-connecting pin, whereby the bore through the front partition of said hollow body is wider than the bore in the rear bore, so as to permit a swinging movement of said pin head.

5. A device according to claim 3, wherein the cord holding the slidable pin against back sliding is a cord made of nylon and the cord-corroding liquid contained in the sealed container is composed of an 85% solution of formic acid in water and methyl alcohol.

6. A device for connecting one end of at least one strap of a safety belt composed of two straps connected together and to a fixed motor car member in proximity of a seat, permitting the quick unfastening of said belt whenever the belt is subjected to a violent pull, said device comprising a member for fastening an elongated hollow body to said fixed car member; a recess in an intermediate position of said hollow body, provided with transversal walls dividing said hollow body into three hollow body sections; a stirrup fastener for fastening one end of said belt, a tang projecting from said fastener and adapted to be inserted in said hollow body recess; a perforation in each of said recess transversal wall and a transversal perforation in said tang of the belt fastener, said perforations being so positioned as to be aligned when said tang is inserted into the recess; a pin provided with a protruding head inserted through said three aligned perforations and projecting into the front section of the hollow body; a frangible container in close proximity of said head and a spring in the rear section of said hollow body tending to pull said pin out of said aligned perforations, thus setting said tang free; a cord retaining said pin in said perforations against the spring pull and a breakable phial containing a chemical liquid, arranged in proximity of said pin head, said liquid being adapted to weaken said cord when soaking same, and said head being adapted to break said phial and allow the liquid therein to flow out into contact with said cord, whereafter the cord, under the pull of the spring acting on said pin is torn off and permits the unthreading of said pin and the setting free of the said tang and of the fastener integral thereof.

7. A fastening device for safety belts in motor cars or the like, having a hollow body attached to a fixed part of the car and comprising a fastener attached to one end of the safety belt hingedly connected to a retaining member maintained in fastener-engaging position by a cord, and a spring for urging said retaining member in fastener-disengaging position whenever the cord fails to hold said retaining member in said engaging position and comprising a breakable container containing a cord-dissolving liquid in proximity of said cord, and a striking head integral of said retaining member and violently hurled against said phial under the violent deceleration consequent to a vehicle crash, so as to promote the breaking of the phial, the soaking of the cord with the dissolvent liquid flowing out of the broken phial and the consequent tearing of the cord and pulling of said retaining member into fastener-disengaging position, whereby said retaining member, said cord, and pulling spring and said breakable phial are housed within said hollow body.

References Cited

UNITED STATES PATENTS 3,146,027  8/1964  Winberg.
3,241,205  3/1966  Genin.

BERNARD A. GELAK, Primary Examiner

U.S. Cl. X.R.

297—385